United States Patent
Takeuchi

(10) Patent No.: US 8,879,093 B2
(45) Date of Patent: Nov. 4, 2014

(54) COMMUNICATION APPARATUS, CONTROL METHOD, AND STORAGE MEDIUM FOR CONVERTING DOCUMENT INFORMATION OR IMAGE INFORMATION INPUT AS A FILE INTO TRANSMISSION DATA AND TRANSMITTING THE OBTAINED DATA

(75) Inventor: Tomoyuki Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1097 days.

(21) Appl. No.: 12/698,801

(22) Filed: Feb. 2, 2010

(65) Prior Publication Data
US 2010/0208293 A1    Aug. 19, 2010

(30) Foreign Application Priority Data
Feb. 13, 2009   (JP) ................................. 2009-031147

(51) Int. Cl.
*G06F 3/12* (2006.01)
*H04N 1/00* (2006.01)
*G06F 15/00* (2006.01)

(52) U.S. Cl.
CPC .... *H04N 1/00214* (2013.01); *H04N 2201/0094* (2013.01); *H04N 1/00212* (2013.01); *H04N 2201/0067* (2013.01); *H04N 1/00217* (2013.01); *H04N 1/00931* (2013.01)
USPC ........................................ 358/1.15; 358/1.13

(58) Field of Classification Search
USPC .............. 358/1.15, 1–12, 1.18, 400, 468, 474
See application file for complete search history.

(56) References Cited

U.S. PATENT DOCUMENTS
2009/0051969 A1*   2/2009   Yoo .............................. 358/1.16

FOREIGN PATENT DOCUMENTS
JP         2003-264666 A         9/2003

* cited by examiner

*Primary Examiner* — Gabriel Garcia
(74) *Attorney, Agent, or Firm* — Canon U.S.A., Inc. IP Division

(57) ABSTRACT

A control method for controlling a communication apparatus used for transmitting a file with efficiency and reliability according to a time required for the conversion processing when a file as a transmission object is converted into transmission data, and the control method includes converting an input file into transmission data, transmitting the transmission data obtained by the conversion processing, measuring a time required for the conversion processing, and controlling the communication apparatus based on the measured time so that, if a file whose time required for the conversion processing is greater than a predetermined value is to be transmitted, communication with the destination is started and the transmission data is transmitted after the conversion processing is executed, and if a file whose time required for the conversion processing is not greater than the predetermined value is to be transmitted, the conversion processing is executed after the communication with the destination is started, and the transmission data obtained by the conversion processing is transmitted.

10 Claims, 13 Drawing Sheets

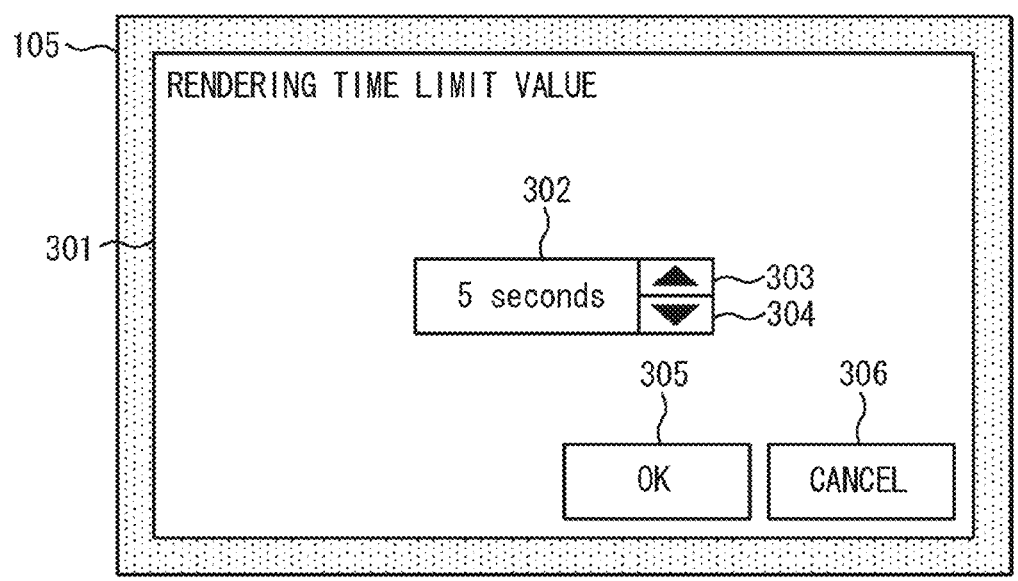

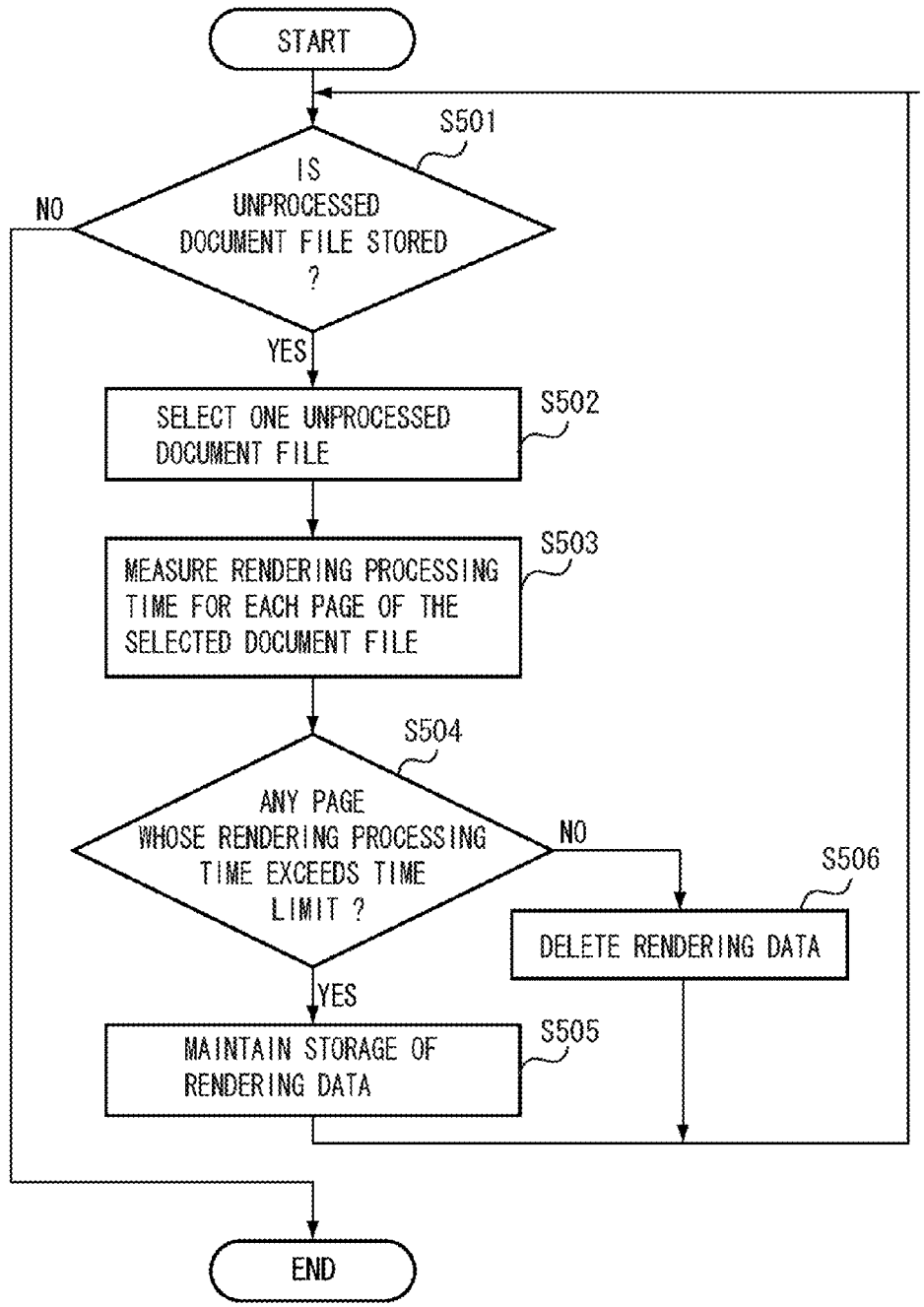

FIG. 9

| DOCUMENT FILE | RENDERING DATA | PAGE NUMBER OF DOCUMENT FILE | PAGE NUMBER OF RENDERING DATA |
|---|---|---|---|
| DOCUMENT FILE 1 | RENDERING DATA 1 | 1 | 1 |
| DOCUMENT FILE 2 | RENDERING DATA 2 | 2 | 2 |
| DOCUMENT FILE 3 | RENDERING DATA 3 | 3 | 3 |
| DOCUMENT FILE 4 | RENDERING DATA 4 | 4 | 4 |
| ... | ... | ... | ... |

| DOCUMENT FILE | |
|---|---|
| DOCUMENT FILE 1 | PREPROCESSING FLAG 1 |
| DOCUMENT FILE 2 | PREPROCESSING FLAG 2 |
| DOCUMENT FILE 3 | PREPROCESSING FLAG 3 |
| DOCUMENT FILE 4 | PREPROCESSING FLAG 4 |
| ... | ... | form
COMMUNICATION APPARATUS, CONTROL METHOD, AND STORAGE MEDIUM FOR CONVERTING DOCUMENT INFORMATION OR IMAGE INFORMATION INPUT AS A FILE INTO TRANSMISSION DATA AND TRANSMITTING THE OBTAINED DATA

BACKGROUND OF THE INVENTION

1. Field of the Invention

The present invention relates to a communication apparatus used for converting an input file into data and transmitting the converted data, a control method, and a storage medium.

2. Description of the Related Art

Conventionally, there is known a communication apparatus that includes a function for converting document information or image information input as a file into transmission data and transmitting the obtained data. For example, Japanese Patent Application Laid-Open No. 2003-264666 discusses a communication apparatus that converts a file into image data in a format receivable by a facsimile machine by using rendering processing when the communication apparatus receives an electronic mail and an attached file of the received electronic mail is to be transmitted to a facsimile machine. The transmission data obtained by the rendering processing is hereinafter referred to as rendering data.

The above-described rendering processing is also necessary in performing facsimile transmission of a file stored in a hard disk included in the communication apparatus. The file is, for example, a file in Portable Document Format (PDF) or text data.

However, the use of the above-described method in transmitting the transmission data generated by executing the rendering processing for a file to be transmitted may cause certain problems. For example, when transmitting rendering data obtained by file conversion using facsimile transmission, if the transmission processing is executed in parallel with the conversion processing, the conversion processing may take time depending on the page content. If the conversion processing takes time, the data may not be transmitted normally.

In the case of facsimile transmission, data is transmitted with an interval less than 6±1 seconds according to a standard (ITU-T.30). Thus, if the conversion processing takes time, this requirement cannot be satisfied and a transmission error may occur.

Although the transmission processing can be started after all the conversion processing is completed, since the time for the conversion processing as well as the time for transmission processing is necessary, the whole processing will take a much time.

Additionally, if it is determined that the destination apparatus is not in a transmission-acceptable state (e.g., malfunction), the executed conversion will be useless.

Further, if the rendering processing of all the files is performed before receiving the transmission instruction and, further, if the rendering data of the files is stored in a memory, in order to store data of a large size, a large amount of memory resources will be used.

SUMMARY OF THE INVENTION

According to an aspect of the present invention, a communication apparatus includes a converting unit configured to convert an input file into transmission data, a transmitting unit configured to transmit the transmission data obtained by conversion processing executed by the converting unit, a measuring unit configured to measure a time required for the conversion processing executed by the converting unit, and a controlling unit configured to perform controlling, based on a result of measurement executed by the measuring unit, wherein if a file whose time required for the conversion processing executed by the converting unit is greater than a predetermined value is to be transmitted, the transmitting unit starts communication with a destination after the converting unit executes the conversion processing, and wherein if a file whose time required for the conversion processing executed by the converting unit is not greater than the predetermined value is to be transmitted, the converting unit executes the conversion processing after the transmitting unit starts communication with the destination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a screen displayed on an operation unit.

FIG. 4 illustrates a management table stored in the hard disk.

FIG. 5 is a flowchart illustrating an example of data processing procedure of the facsimile machine.

FIG. 9 illustrates an example of a management table stored in the hard disk.

DESCRIPTION OF THE EMBODIMENTS

Various exemplary embodiments, features, and aspects of the invention will be described in detail below with reference to the drawings.

Figure 1:
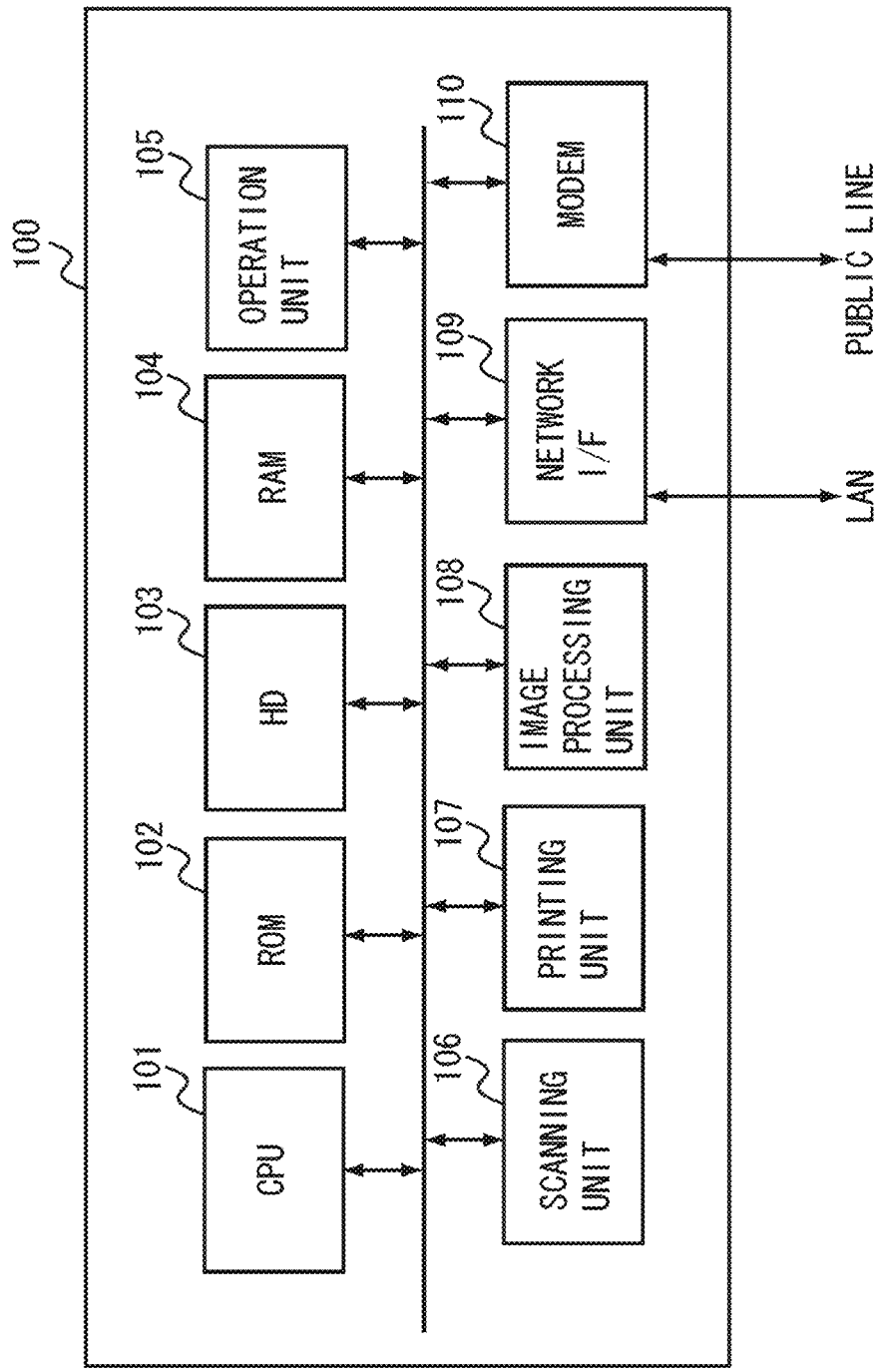
FIG. 1 is a block diagram illustrating a configuration of a facsimile machine.

FIG. 1 is a block diagram illustrating a configuration of a facsimile machine 100 as an example of a communication apparatus according to an exemplary embodiment of the present invention. A central processing unit (CPU) 101 controls execution of various processing methods described below by loading a control program stored in a read-only memory (ROM) 102 or a hard disk (HD) 103 to a random access memory (RAM) 104 and executing it.

An operation unit 105 includes various keys such as a numeric keypad and a start key, which are used when a user makes settings or gives instructions. Further, the operation unit 105 includes a display unit that displays a user interface used for displaying the state of the apparatus. The user interface is also used when the user inputs instructions.

A scanning unit 106 scans an image of a document and generates image data. A print unit 107 prints an image of the image data on a recording medium.

A network interface 109 connects the facsimile machine 100 to a Local Area Network (LAN). The facsimile machine 100 transmits data to and receives data from a network apparatus on the LAN via the network interface (network I/F) 109.

A modem 110 connects the facsimile machine 100 to a public line. The facsimile machine 100 performs facsimile communication between a facsimile machine on the public line via the modem 110 and transmits/receives facsimile data.

An image processing unit 108 performs image processing on the image data generated by the scanning unit 106, image data to be used for the print processing performed by the print unit 107, and the image data transmitted and received via the network interface 109 or the modem 110.

Figure 2:
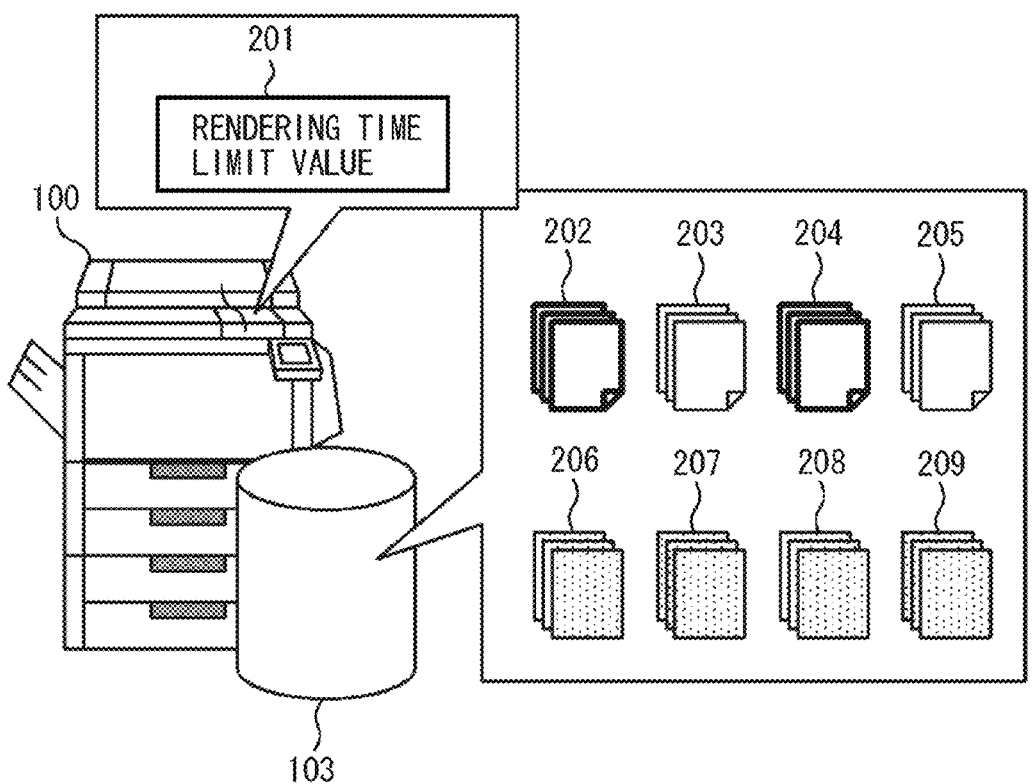
FIG. 2 illustrates data stored in a hard disk.

FIG. 2 is a conceptual illustration of data stored in the hard disk 103. According to the present exemplary embodiment, a data format of a document file stored in the hard disk 103 is different from a data format of the document file when it is transmitted by the facsimile machine.

In other words, before transmitting a document file stored in the hard disk 103, the image processing unit 108 renders the document file and converts the file into transmission data. Although a document file in PDF is converted into transmission data in raster JPEG format according to the present exemplary embodiment, the combination of the data formats of the document file and the transmission data is not limited to such a combination.

In FIG. 2, the hard disk 103 stores data of a file of image data generated by the scanning unit 106. The hard disk 103 also stores data of a document file transmitted from a host computer via the network interface 109 as print data.

A limit value 201 is a limit value for a rendering time. The user sets the limit value 201 by using the user interface displayed on a display unit 301 illustrated in FIG. 3. The rendering time is a time required to execute rendering processing on each page included in a document file when the document file stored in the hard disk 103 is transmitted. The rendering processing is performed by the image processing unit 108.

Further, the limit value for the rendering time is a maximum allowable value of the time necessary in converting one page included in a document file to be transmitted into transmission data. The limit value 201 is stored in the hard disk 103.

Document files 202 to 205 are also stored in the hard disk 103. Rendering data 206 to 209 is transmission data obtained by the image processing unit 108 by executing the rendering processing on the document files 202 to 205. FIG. 2 illustrates a state where the rendering data 206 to 209 is stored in the hard disk 103. The relation between the document files 202 to 205 and the rendering data 206 to 209 is managed by a document file management table 401 illustrated in FIG. 4.

FIG. 3 illustrates an example of an operation screen used for setting the limit value 201 and displayed on a display unit included in the operation unit 105.

In FIG. 3, the display unit 301 displays the operation screen. A value set as the limit value of the rendering time is displayed in a box 302. According to the example illustrated in FIG. 3, "5 seconds" is set as the limit value 201 in the box 302.

Change buttons 303 and 304 are used for changing the limit value of the rendering time. By touching the change button 303 or 304, the user can either increase or decrease the numeric value set in the box 302. The user can also set the limit value 201 by entering a numeric value using a numeric keypad included in the operation unit 105.

If the user selects a determination button (OK button) 305, the value set in the box 302 is determined as the limit value 201. Then, the screen of the display unit 301 is closed. A cancel button 306 is used for cancelling a setting value. By the user touching the cancel button 306, the screen of the display unit 301 is closed with the value of the limit value 201 unchanged.

FIG. 4 is an example of a document file management table stored in the hard disk 103 illustrated in FIG. 2. In FIG. 4, a document file is associated with rendering data obtained by the rendering processing on that document file.

Thus, according to the example illustrated in FIG. 4, if the rendering data is obtained from a document file that contains a plurality of pages, each piece of rendering data obtained from each page of the document file is gathered and managed as one piece of rendering data.

The document file management table 401 is stored in the hard disk 103. As described above, the document file management table 401 contains a relation between a document file stored in the hard disk 103 and a corresponding piece of rendering data.

A column 402 has the heading "document file". A name of a document file stored in the hard disk 103 is set in the column 402. A column 403 has the heading "rendering data". Rendering data stored in the hard disk 103 is set in the column 403. Rendering data in the column 403 is generated from a document file in the column 402 and in the same row.

FIG. 5 is a flowchart illustrating an example of a data processing procedure of the facsimile machine 100. Each of steps S501 to S506 is realized by the CPU 101 by loading a program stored in the ROM 102 or the hard disk 103 into the RAM 104 and executing it.

In step S501, the CPU 101 determines whether an unprocessed document file is stored in the hard disk 103. If the CPU 101 determines that such a document file is stored (YES in step S501), the process proceeds to step S502. If the CPU 101 determines that such a document file is not stored (NO in step S501), then the process ends.

In step S502, the CPU 101 selects one document file to be processed from the unprocessed document files. In step S503, the CPU 101 instructs the image processing unit 108 to execute the rendering processing on each page included in the selected document file.

The rendering data obtained by the rendering processing is stored in the hard disk 103. Further, the CPU 101 measures the time required for the image processing unit 108 to perform the rendering processing for each page.

In step S504, the CPU 101 determines whether a page whose value of the time required for the conversion is greater than the limit value 201 (predetermined value) of the time required for the rendering exists. If the CPU 101 determines that such a page exists (YES in step S504), the process proceeds to step S505. In step S505, the process returns to step S501 while holding the storage of the rendering data of all the pages obtained according to the rendering processing in the hard disk 103.

On the other hand, if the CPU 101 determines that a page whose value of the time required for the conversion is greater than the limit value 201 does not exist (NO in step S504), the process proceeds to step S506. In step S506, the rendering data generated in step S503 is deleted, and the process returns to step S501.

Although the generated rendering data is deleted from the RAM 104, the rendering data need not necessarily be deleted from the memory. In other words, the rendering data may be made unusable by changing the state of the rendering data.

According to a first exemplary embodiment, rendering data corresponding to a document file not including a page whose value of the time required for the rendering processing is not greater than the limit value 201 is deleted. On the other hand, rendering data corresponding to a document file including a page whose value of the time required for the rendering processing is greater than the limit value 201 is continuously stored in the hard disk 103.

Figure 6:
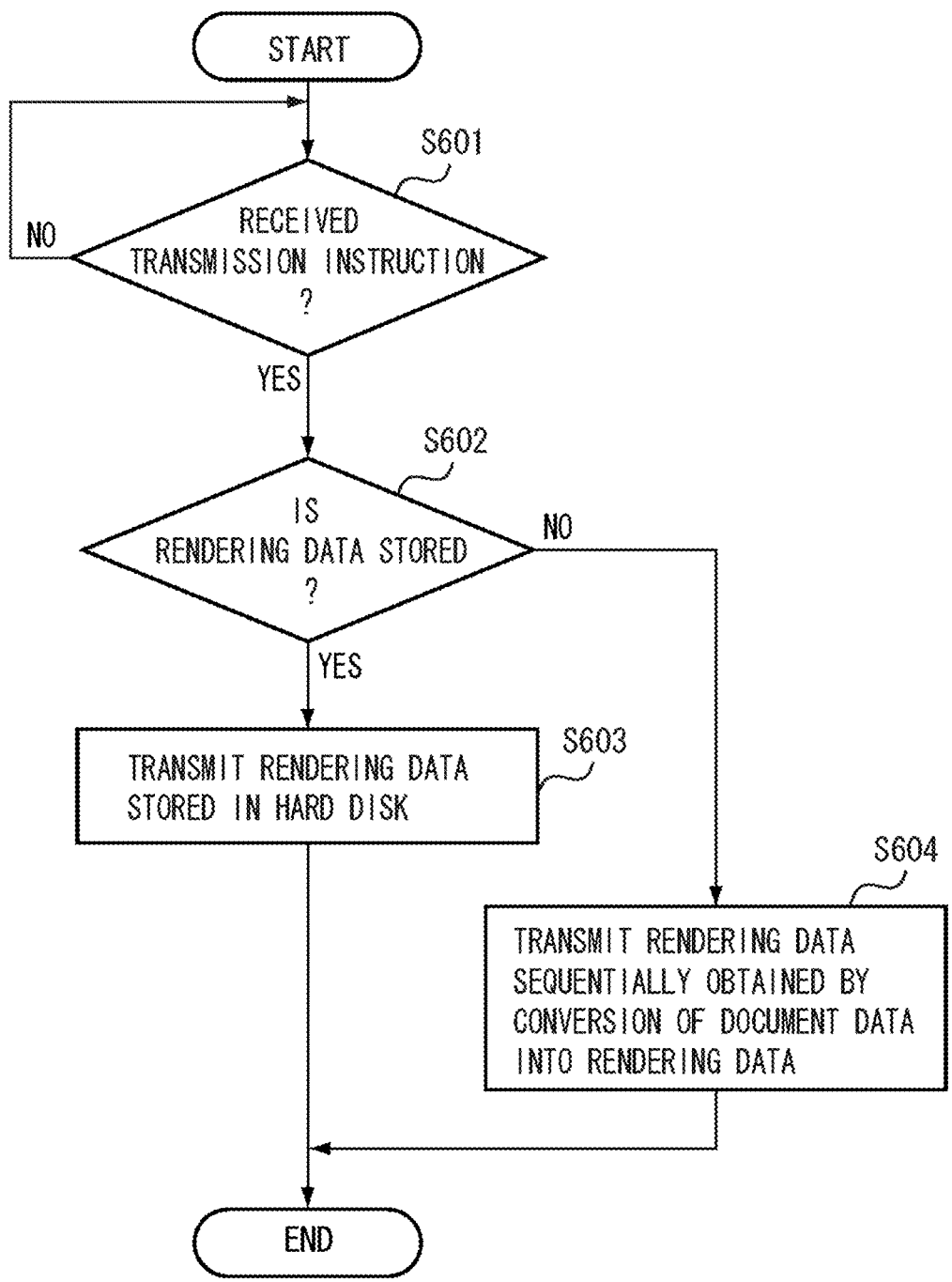
FIG. 6 is a flowchart illustrating another example of data processing procedure of the facsimile machine.

FIG. 6 is a flowchart illustrating an example of a data processing procedure of the facsimile machine 100. Each of steps S601 to S604 is realized by the CPU 101 by loading a program stored in the ROM 102 or the hard disk 103 into the RAM 104 and executing it. The operation described in the flowchart in FIG. 6 starts when a transmission instruction given by the user is received after the processing of each step in the flowchart in FIG. 5 is executed.

In step S601, the CPU 101 determines whether a transmission instruction of a file given by the user is received. If the CPU 101 determines that the instruction is received (YES in step S601), the process proceeds to step S602. If the CPU 101 determines that the instruction is not received (NO in step S601), the process returns to Step S601.

In step S602, the CPU 101 determines whether the rendering data corresponding to the document file designated as the transmission object is stored in the hard disk 103 by referring to the document file management table 401 illustrated in FIG. 4.

If the corresponding rendering data is stored (YES in step S602), the process proceeds to step S603. If the corresponding rendering data is not stored (NO in step S602), the process proceeds to step S604. In the present exemplary embodiment, the rendering data is the transmission data obtained through the conversion process on the file to be transmitted when the transmission of the file is instructed by the user.

In step S603, the CPU 101 controls the modem 110, starts the communication with the destination facsimile machine, and transmits the rendering data read out from the hard disk 103 to the facsimile machine.

On the other hand, in step S604, the CPU 101 controls the modem 110, starts the communication with the destination facsimile machine as well as instructs the image processing unit 108 to execute the rendering processing of the document file, and transmits the obtained rendering data to the facsimile machine.

Although the rendering processing performed by the image processing unit 108 is started after the communication with the destination facsimile machine is started in the above-described example, the rendering processing can be started at different timing. In other words, the communication can be started after the rendering processing of a part of the document file as the transmission object is completed. The rest of the rendering processing can be executed in parallel with the communication processing after the communication is started.

As described above, according to the first exemplary embodiment, before the transmission instruction given by the user is received, the processing for converting the file stored in the hard disk 103 into transmission data (rendering processing) is executed while the time required for the processing is measured for each page.

If a page whose value of the time required for the rendering processing is greater than the predetermined limit value 201 does not exist, the generated rendering data is deleted. If a page whose value of the time required for the rendering processing is greater than the predetermined limit value 201 exists, the generated rendering data is continuously stored.

In this way, the transmission error that occurs when the conversion processing, which is executed after the communication with the destination is started, is not processed in time can be prevented. Further, since the rendering data is generated before the transmission instruction given by the user is received, the data can be promptly transmitted when the transmission instruction given by the user is received.

Further, since the rendering data of a selected document file that takes time in the conversion and not the rendering data of all the document files stored in the hard disk 103 is continuously stored, wasting of the memory resources can be prevented.

Although rendering processing of all the document files stored in the hard disk 103 is executed in advance according to the example described above, the application of the rendering processing can be limited to only some of the document files stored in the hard disk 103. For example, when the document files are stored in the hard disk 103, the above-described rendering processing can be performed to only the files that are designated by the user as the document files to be transmitted.

According to the first exemplary embodiment, the rendering processing is executed before a transmission instruction given by the user is received. By measuring the time required for the processing, the document file that takes time in the rendering processing can be selected and the rendering data of the selected document file can be stored.

According to a second exemplary embodiment, by considering a utilization rate of the CPU 101 of the facsimile machine 100, the document file whose rendering data needs to be generated before it is actually transmitted can be selected with increased accuracy.

Further, regarding a document file that includes a page whose value of the time required for the rendering processing is greater than the limit value 201, the whole rendering data of the document file including that page is stored according to the first exemplary embodiment. According to the second exemplary embodiment, only the rendering data of the page whose value of the time required for the rendering processing is greater than the limit value 201 (predetermined value) is stored and the rendering data of other pages is deleted.

Figure 7:
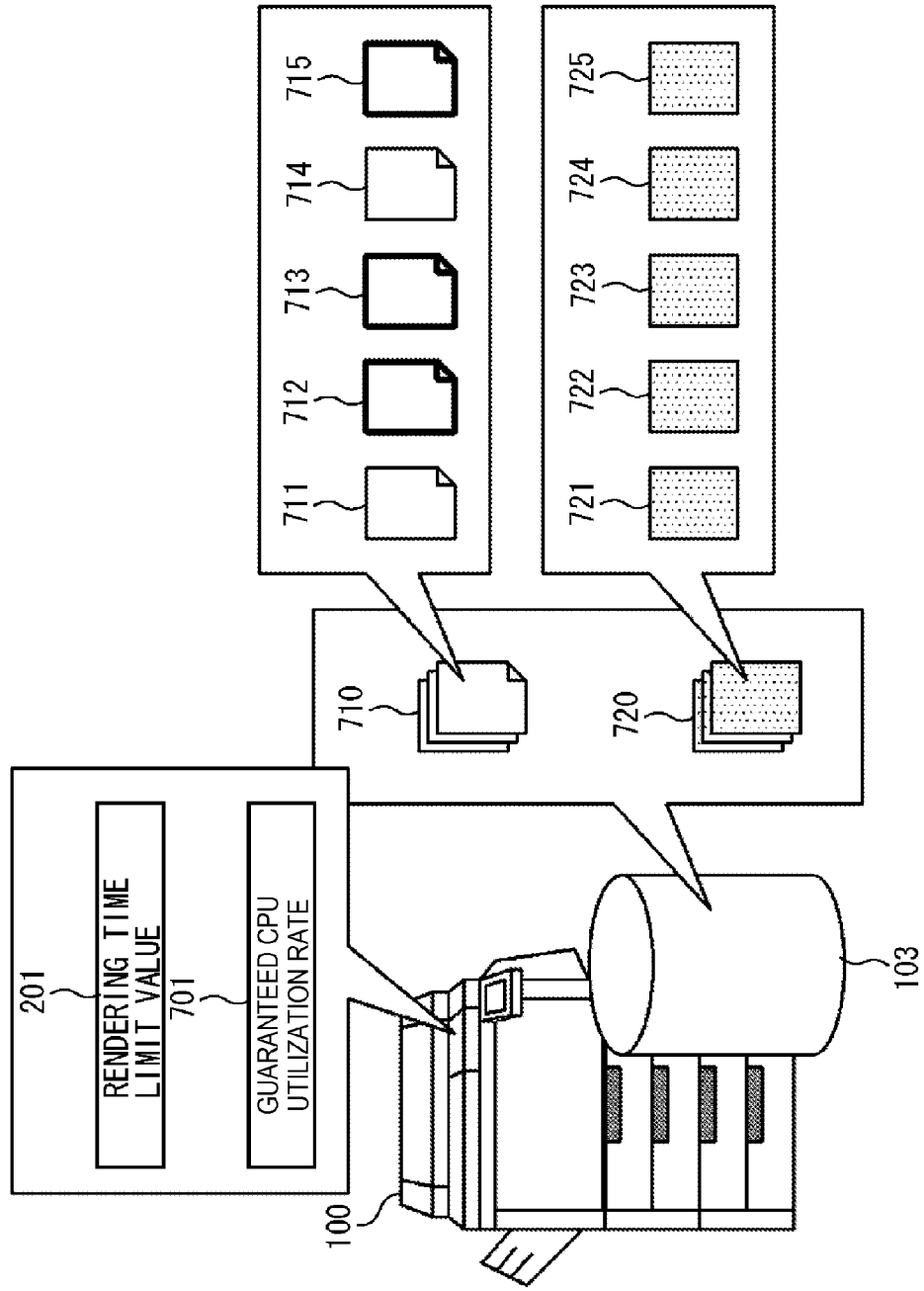
FIG. 7 illustrates data stored in the hard disk.

FIG. 7 is a conceptual illustration of data stored in a hard disk 103. The components similar to those in FIG. 2 are denoted by the same reference numerals. A guaranteed utilization rate 701 is a CPU utilization rate that guarantees the operation of the CPU 101. The user can set an arbitrary value as the guaranteed utilization rate by using the screen illustrated in FIG. 8. The guaranteed CPU utilization rate is used when the user selects a document file that takes time in the rendering.

Even if a document file is determined that it can be rendered in a short time according to the rendering processing performed in advance as in the first exemplary embodiment, an error may occur when the data is actually transmitted.

This is because the load applied to the CPU 101 may be different between when the rendering processing is performed in advance and when the rendering processing is performed while the data is actually being transmitted, due to the presence of another job (e.g., receiving job or print job).

For example, a case where the CPU utilization rate is 0% when the rendering processing is executed in advance while another job does not exist, and the CPU utilization rate is 50% when the rendering processing is executed at the time the transmission data is actually transmitted while another job is being executed will be considered.

In this case, the rendering processing when the CPU utilization rate is set to 50% will take approximately twice the time compared to when the CPU utilization rate is 0%. Thus, even if the rendering processing is determined as not taking much time in the measurement performed in advance, the conversion processing may not be completed in time of the transmission when the data is actually transmitted. Thus, in some cases, a transmission error occurs.

According to the second exemplary embodiment, the user sets the CPU utilization rate and a document file that takes much time in the rendering processing is selected using this value. Accordingly, a document file that needs to generate the rendering data in advance can be selected more accurately.

Returning now to the description of the illustration in FIG. 7, a document file 710 is stored in the hard disk 103. Rendering data 720 is generated by the image processing unit 108 by executing the rendering processing on the document file 710. The rendering data 720 is stored in the hard disk 103.

Pages 711 to 715 are included in the document file 710. Rendering pages 721 to 725 are included in the rendering data 720 that corresponds to the document file 710. The rendering pages 721 to 725 correspond to the document pages 711 to 715, respectively.

The relation between the document file 710 and the rendering data 720, and also the relation between the document pages 711 to 715 and the rendering pages 721 to 725 are managed by a document file management table 901 illustrated in FIG. 9.

Figure 8:
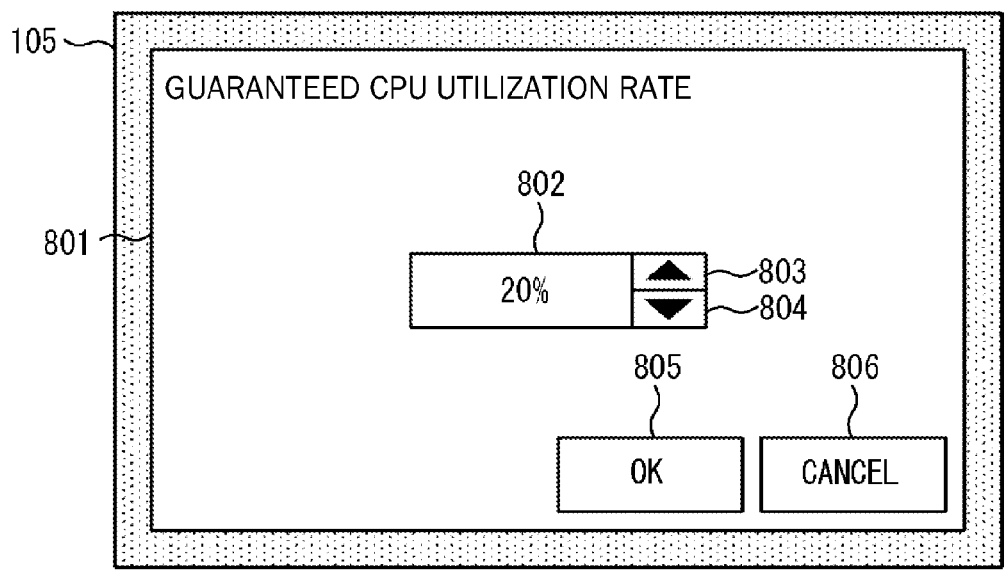
FIG. 8 illustrates another example of a screen displayed on the operation unit.

FIG. 8 illustrates an example of an operation screen used for setting the guaranteed CPU utilization rate 701 and displayed on a display unit included in the operation unit 105.

In FIG. 8, a display unit 801 displays the operation screen. A value set as the guaranteed CPU utilization rate is displayed in a box 802. According to the example illustrated in FIG. 8, "20%" is set in the box 802 as the guaranteed CPU utilization rate 701.

Change buttons 803 and 804 are used for changing the guaranteed CPU utilization rate. By touching the change button 803 or 804, the user can either increase or decrease the numeric value set in the box 802. The user can also set the guaranteed CPU utilization rate 701 by entering a numeric value via a numeric keypad included in the operation unit 105.

If the user selects a determination button (OK button) 805, the value set in the box 802 is determined as the guaranteed CPU utilization rate 701. Then, the screen of the display unit 801 is closed. A cancel button 806 is used for cancelling a setting value. By the user touching the cancel button 806, the screen of the display unit 801 is closed with the value of the guaranteed CPU utilization rate 701 unchanged.

FIG. 9 is an example of a document file management table stored in the hard disk 103 illustrated in FIG. 2. In FIG. 9, a page included in a document file is associated with rendering data obtained by the rendering processing of that page of the document file.

The document file management table 901 is stored in the hard disk 103. As described above, the document file management table 901 contains a relation between a document file stored in the hard disk 103 and a corresponding piece of rendering data.

A column 902 has the heading "document file". A file name of a document file stored in the hard disk 103 is set in this column 902. A column 903 has the heading "rendering data". Rendering data stored in the hard disk 103 is set in this column 903.

A column 904 has the heading "page number of document file". A number of a page in a document file in the column 902 is indicated in the column 904. A column 905 has the heading "page number of rendering page". A page number of the rendering data in the column 903 is indicated in the column 905.

Rendering data in the column 903 is generated from a page of a document file in the column 902 and in the same row as that rendering data. Further, a document file in the column 902 and a document file page number in the column 904, which are in the same row, and rendering data in the column 903 and rendering page in the column 905, which are generated from that document file and the document page are in the same row.

Figure 10:
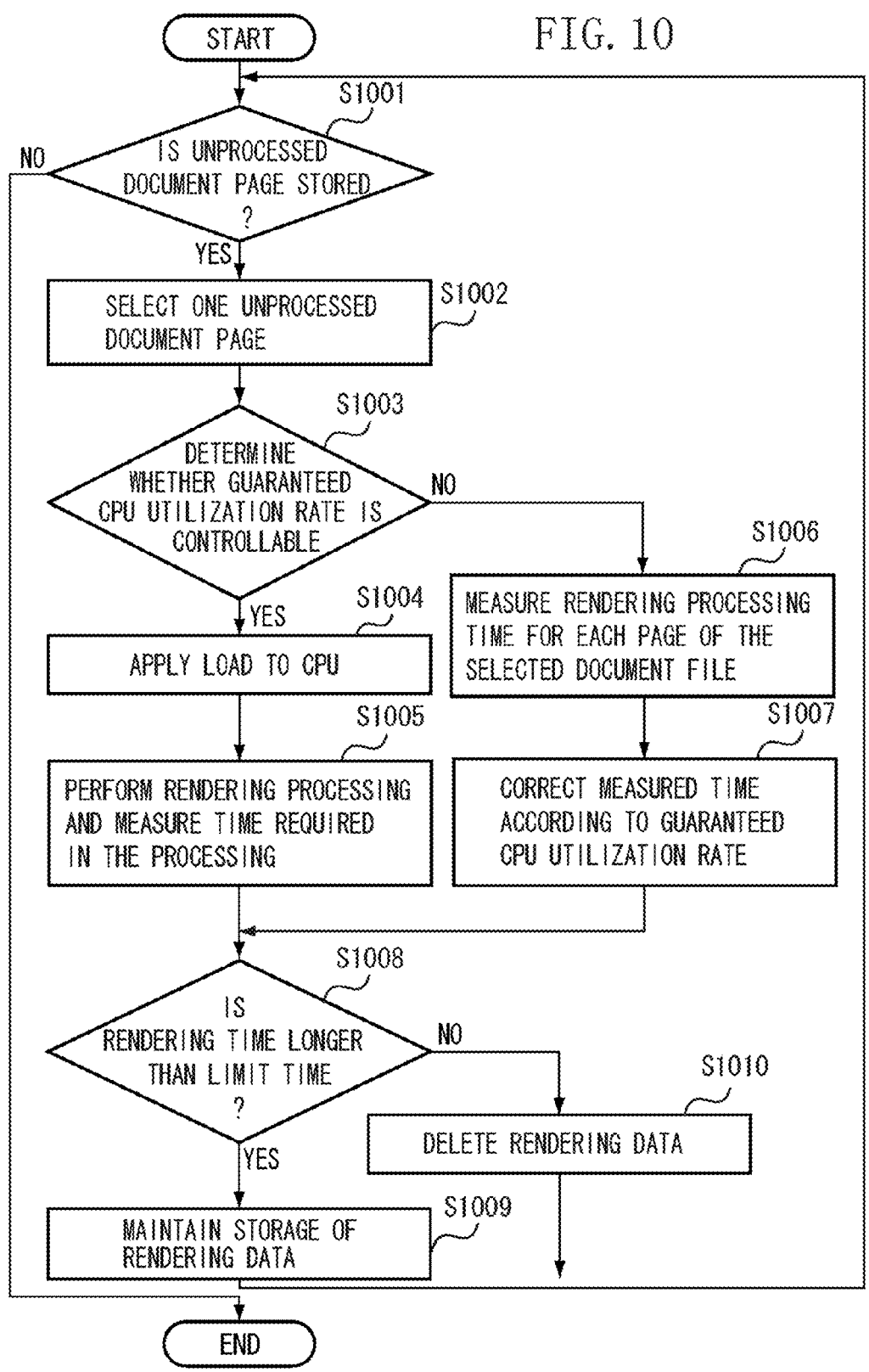
FIG. 10 is a flowchart illustrating an example of data processing procedure of the facsimile machine.

FIG. 10 is a flowchart illustrating an example of a data processing procedure of the facsimile machine 100. Each of steps S1001 to S1010 is realized by the CPU 101 by loading a program stored in the ROM 102 or the hard disk 103 into the RAM 104 and executing it.

In step S1001, the CPU 101 determines whether an unprocessed document page is stored in the hard disk 103. If the CPU 101 determines that such a document page is stored (YES in step S1001), the process proceeds to step S1002. If the CPU 101 determines that such a document page is not stored (NO in step S1001), then the process ends.

In step S1002, the CPU 101 selects one document page to be processed from among the unprocessed document pages. In step S1003, the CPU 101 determines whether the utilization rate of the CPU 101 can be controlled. This determination is made, for example, according to whether or not another job exists.

In other words, if the utilization rate is changed when another job is being executed, the load applied to the CPU 101 will be changed. This may affect the processing of the job being executed. Thus, the CPU 101 determines that the utilization rate of the CPU 101 cannot be controlled. Further, whether the CPU 101 can be controlled can be determined by whether a component used for controlling the utilization of the CPU 101 is provided in the facsimile machine 100.

If the CPU 101 determines that the utilization rate of the CPU 101 is controllable (YES in step S1003), the process proceeds to step S1004. If the CPU 101 determines that the utilization rate is not controllable (NO in step S1003), the process proceeds to step S1006.

In step S1004, a load is applied to the CPU 101 according to the value set as the guaranteed CPU utilization rate 701. To be more precise, by making access to the CPU 101 according to a rate that corresponds to the utilization rate, for example, by generating a command for writing data of a predetermined bit number into a memory, a load is applied to the CPU 101.

As a load applying method other than the one described above, the CPU 101 can be loaded by making the CPU 101 execute a numerical calculation according to its processing capability. According to these methods, the CPU 101 will be set in a load-applied state although another job does not actually exist.

In step S1005, the CPU 101 instructs the image processing unit 108 to execute the rendering processing of the selected document page. The rendering data obtained by the rendering processing is stored in the hard disk 103. Further, the CPU 101 measures the time required for the image processing unit 108 to execute the rendering processing.

On the other hand, in step S1006, the CPU 101 instructs the image processing unit 108 to execute the rendering processing of the selected document page in a state where a load is not applied to the CPU 101.

The rendering data obtained by the rendering processing is stored in the hard disk 103. Further, the CPU 101 measures the time required for the image processing unit 108 to perform the rendering processing.

In step S1007, the CPU 101 corrects the time measured in step S1006. More particularly, if "20%" is set as the guaranteed CPU utilization rate, since the capability rate of the CPU 101 in an unloaded state to the CPU 101 in a loaded state will be 100:80, the measured time is corrected by multiplying 1.25 to the measured time.

Further, in step S1006, if additional load is applied to the CPU 101 due to the CPU processing another job when it is executing the rendering processing, the measured time can be corrected by considering the utilization rate.

If these corrections are made, even if load is not applied to the CPU 101 as in steps S1004 and S1005, a time similar to the time obtained by executing the rendering processing while the CPU 101 is loaded can be obtained.

In step S1008, the CPU 101 determines whether the time required for the conversion processing is greater than the limit value 201 (predetermined value). If the CPU 101 determines that the required time is greater than the limit value 201 (YES in step S1008), the process proceeds to step S1009. In step S1009, the process returns to step S1001 while holding the storage of the rendering data obtained according to the rendering processing, in the hard disk 103.

On the other hand, if the CPU 101 determines that the required time is not greater than the limit value 201 (NO in step S1008), the process proceeds to step S1010. In step S1010, the rendering data generated in step S1005 or S1006 is deleted. Then, the process returns to step S1001.

According to the second exemplary embodiment, rendering data corresponding to a document page whose value of the time required for the rendering processing is not greater than the limit value 201 is deleted. On the other hand, the rendering data corresponding to a document page whose value of the time required for the rendering processing is greater than the limit value 201 will be stored.

If the user gives a transmission instruction to the facsimile machine in a state the processing of each step illustrated in the flowchart in FIG. 10 is completed, additional processing will be performed according to the flowchart illustrated in FIG. 6.

As describe above, according to the second exemplary embodiment, when processing for converting transmission data of a page in a file (rendering processing) is executed in advance and the time required for the processing is measured, processing for loading the CPU or correcting the measured time is performed.

Accordingly, even if the load of the CPU when the rendering processing is executed in advance and the load of the CPU when the rendering processing is executed at the time when the data is actually transmitted are different, a transmission error that occurs when the conversion processing cannot be completed by the time limit can be prevented.

Further, since the rendering data of a page that takes much time in the conversion processing is continuously stored in the hard disk while the rendering data of other pages in the same document file is deleted, memory resources to be used can be reduced compared to the first exemplary embodiment.

According to the first exemplary embodiment, the rendering processing is executed before the transmission instruction given by the user is received. Further, by measuring the time required for the processing, the document file that takes much time in the rendering processing is selected, and the rendering data is stored accordingly.

However, in this case, rendering processing is executed for a document file that is not likely to be selected as a transmission object. This means that unnecessary processing is performed.

According to a third exemplary embodiment, the rendering processing is executed when the transmission instruction given by the user is received. Although the obtained rendering data is transmitted to the instructed destination by facsimile transmission (first transmission processing), the transmitted rendering data is continuously stored after the transmission. In this way, when transmission of the same document file is instructed the next time, the stored rendering data can be used (second transmission processing).

Figure 11:
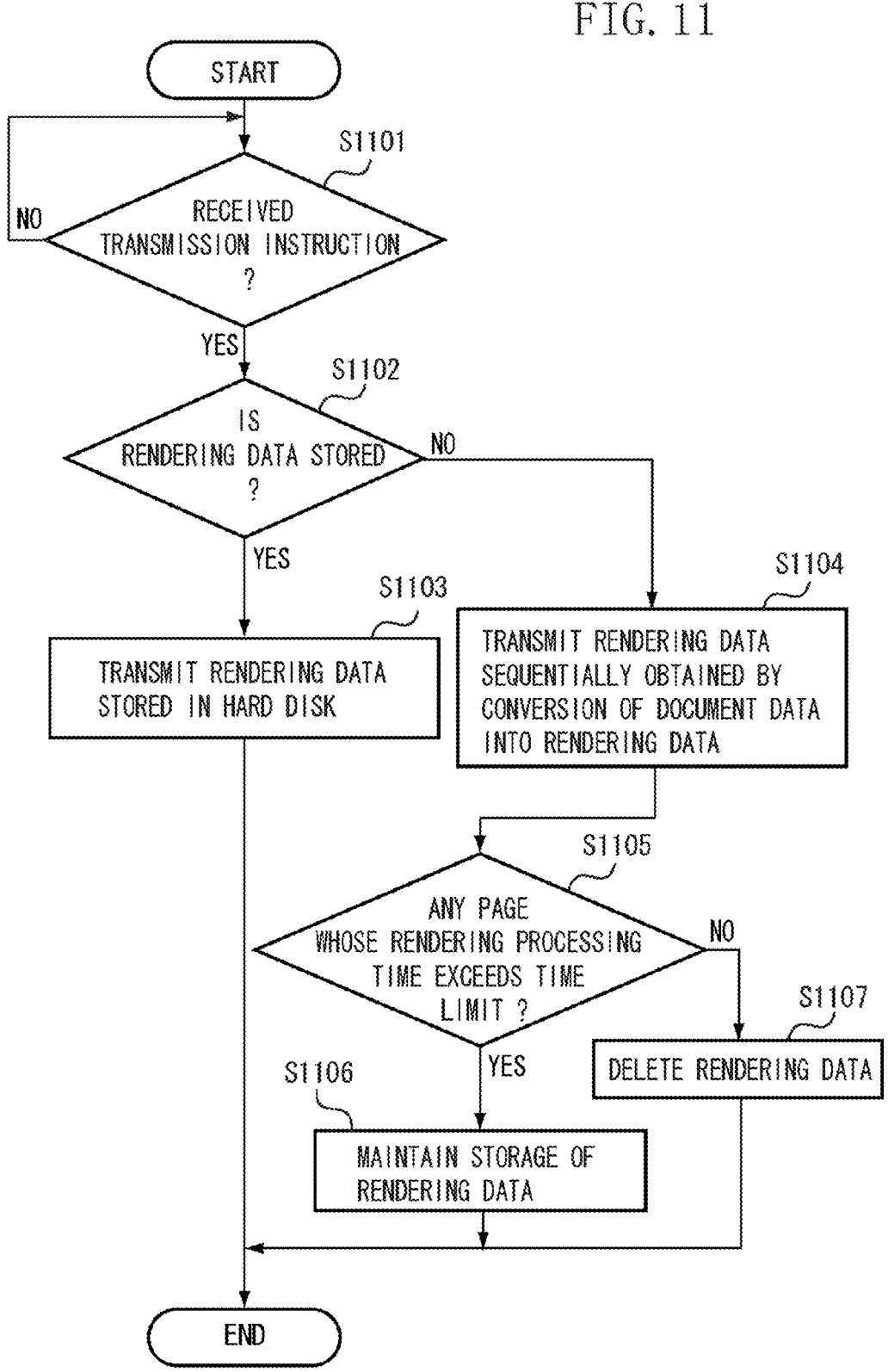
FIG. 11 is a flowchart illustrating another example of data processing procedure of the facsimile machine.

FIG. 11 is a flowchart illustrating an example of a data processing procedure of the facsimile machine 100. Each of steps S1101 to S1107 is realized by the CPU 101 by loading a program stored in the ROM 102 or the hard disk 103 into the RAM 104 and executing it.

In step S1101, the CPU 101 determines whether a transmission instruction of a file given by the user is received. If the CPU 101 determines that the instruction is received (YES in step S1101), the process proceeds to step S1102. If the CPU 101 determines that the instruction is not received (NO in step S1101), the CPU 101 waits until the transmission instruction given by the user is received.

In step S1102, the CPU 101 determines whether the rendering data corresponding to the document file designated as the transmission object is stored in the hard disk 103. If the corresponding rendering data is stored (YES in step S1102), the process proceeds to step S1103. If the corresponding rendering data is not stored (NO in step S1102), the process proceeds to step S1104.

In step S1103, the CPU 101 controls the modem 110, starts the communication with the destination facsimile machine, and transmits the rendering data read out from the hard disk 103 to the facsimile machine. In the present exemplary embodiment, the rendering data is the transmission data obtained through the conversion process of the file to be transmitted into data when the transmission of the file is instructed by the user.

On the other hand, in step S1104, the CPU 101 controls the modem 110 to start the communication with the destination facsimile machine as well as instructs the image processing unit 108 to execute the rendering processing on the document file, and transmits the obtained rendering data to the facsimile machine.

Although the rendering processing performed by the image processing unit 108 is started after the communication with the destination facsimile machine is started in the above-described example, the rendering processing can be started at different timing. In other words, the communication can be started after the rendering processing of a part of the document file as the transmission object is completed. The rest of the rendering processing can be executed in parallel with the communication processing after the communication is started.

When the rendering processing on the document file is executed in step S1104, the rendering time required for the processing is measured for each page.

In step S1105, the CPU 101 determines whether a page whose value of the time required for the conversion processing is greater than the limit value 201 (predetermined value) exists. If the CPU 101 determines that such a page exists (YES in step S1105), the process proceeds to step S1106. In step S1106, the process ends while holding the storage of the rendering data obtained according to the rendering processing in the hard disk 103.

On the other hand, if the CPU 101 determines that a page whose value of the time required for the conversion is greater than the limit value 201 does not exist (NO in step S1105), the process proceeds to step S1107. In step S1107, the rendering data generated in step S1104 is deleted, and the process ends.

According to the above-described example, the time actually required for the rendering processing is measured, and a document file that takes much time in the rendering processing is selected based on the result of the measurement. A different process, however, can be taken in determining such a document file. For example, when the data is transmitted in step S1104, if the conversion processing is not completed in time and a transmission error occurs, such a document file can be determined as a file that takes much time in the rendering processing.

According to the third embodiment, since the rendering processing is performed when the first transmission processing is executed, and the rendering data obtained through the rendering processing is stored, rendering data necessary for the second transmission processing can be obtained without repeating the rendering processing.

According to the first exemplary embodiment, the rendering processing is executed before a transmission instruction given by the user is received. By measuring the time required for the processing, the document file that takes much time in the rendering processing is selected and the rendering data of the selected document file is stored.

However, although the document file that takes much time in the rendering processing is selected, still a considerable amount of memory resources is used in storing the rendering data. Thus, according to a fourth exemplary embodiment, the time required for the rendering processing is measured by executing the rendering processing in advance and, further, information (a flag) is added to a document file including a page that takes much time in the rendering processing so that such a document file can be identified.

Figure 12:
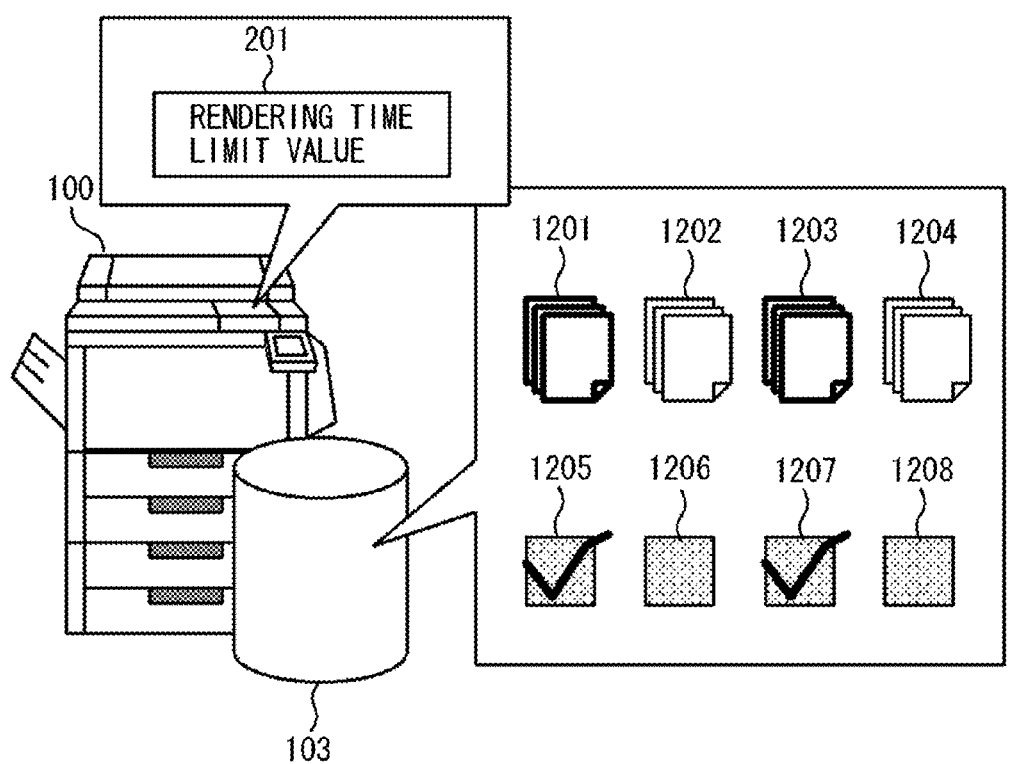
FIG. 12 illustrates data stored in the hard disk.

FIG. 12 is a conceptual illustration of data stored in a hard disk 103. The components similar to those in FIG. 2 are denoted by the same reference numerals.

Document files 1201 to 1204 are stored in the hard disk 103. Preprocessing flags 1205 to 1208 correspond to the document files 1201 to 1204, respectively. The preprocessing flags 1205 to 1208 are information used for identifying whether the rendering processing is necessary before the communication is started at the time when the document files 1201 to 1204 are transmitted.

Figures 13, 14:
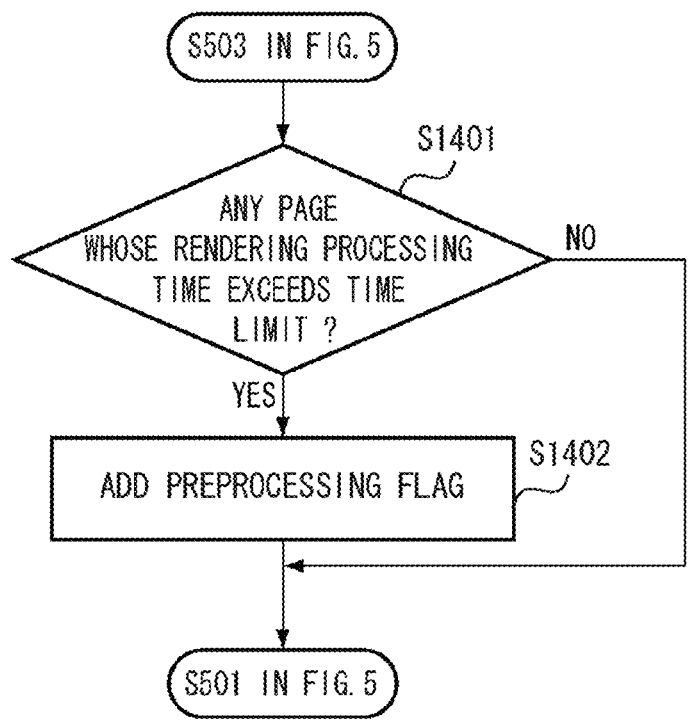
FIG. 13 illustrates another example of a management table stored in the hard disk.
FIG. 14 is a flowchart illustrating an example of data processing procedure of the facsimile machine.

FIG. 13 illustrates an example of a document file management table 1301 that manages a relation between the document files 1201 to 1204 illustrated in FIG. 12 and the preprocessing flags 1205 to 1208. The example in FIG. 13 is a case where the document file management table 1301 is stored in the hard disk 103.

In FIG. 13, a relation between a document file stored in the hard disk 103 and a preprocessing flag is registered in a document file management table 1301. The example in FIG. 13 is a case where the preprocessing flags are separately managed for each file.

A column 1302 has the heading "document file". A file name of a document file stored in the hard disk 103 is set in the column 1302. A column 1303 has the heading "preprocessing flag". Preprocessing flags stored in the hard disk 103 are set in this column 1303.

A document file in the column 1302 and a preprocessing flag in the column 1303 generated from the document file and indicating whether the rendering processing needs to be completed before the start of the communication, are set in the same row.

FIG. 14 is a flowchart illustrating an example of a data processing procedure of the facsimile machine 100. Steps S1401 and S1402 are realized by the CPU 101 by loading a program stored in the ROM 102 or the hard disk 103 into the RAM 104 and executing it. The flowchart in FIG. 14 is executed in place of steps S504 to S506 in the flowchart in FIG. 5.

In step S1401, the CPU 101 determines whether a page whose value of the time required for the conversion is greater than the limit value 201 (predetermined value) of the time required for the rendering exists. If the CPU 101 determines that such a page exists (YES in step S1401), the process proceeds to step S1402. In step S1402, the CPU 101 updates the document file management table 1301 by adding the above-described preprocessing flag to the document file which is to go under the rendering processing.

On the other hand, if the CPU 101 determines that a page whose value of the time required for the conversion is greater than the limit value 201 does not exist (NO in step S1401), the process returns to step S501 without performing the process in step S1402.

Figure 15:
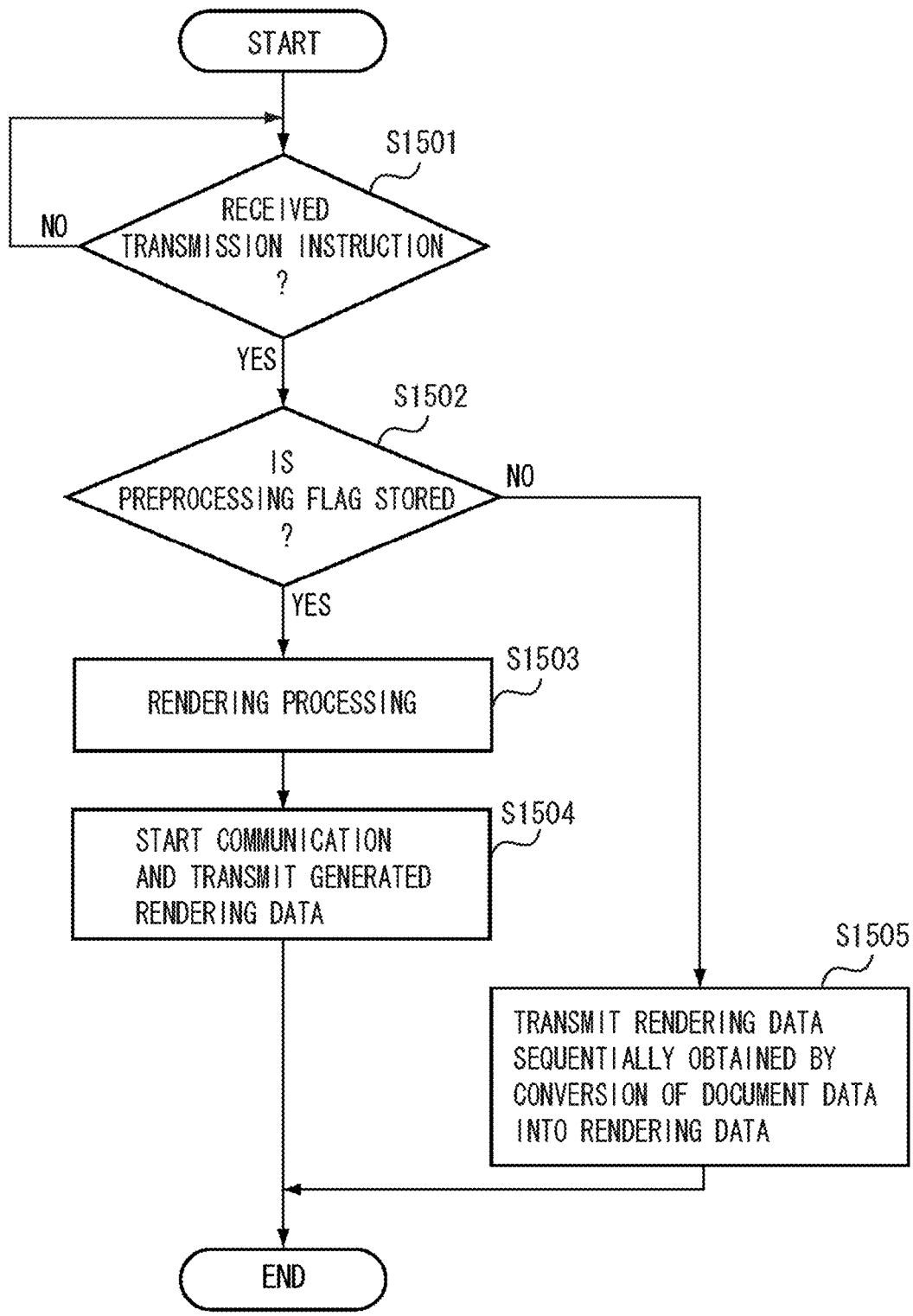
FIG. 15 is a flowchart illustrating an example of data processing procedure of the facsimile machine.

FIG. 15 is a flowchart illustrating an example of a data processing procedure of the facsimile machine 100. Each of steps S1501 to S1505 is realized by the CPU 101 by loading a program stored in the ROM 102 or the hard disk 103 into the RAM 104 and executing it.

The flowchart in FIG. 15 illustrates the operation of the facsimile machine when a transmission instruction given by the user is received in a state where the processing of each step in the flowchart in FIG. 14 is completed. The flowchart in FIG. 15 is performed in place of the flowchart illustrated in FIG. 6.

In step S1501, the CPU 101 determines whether a transmission instruction of a file given by the user is received. If the CPU 101 determines that the instruction is received (YES in step S1501), the process proceeds to step S1502. If the CPU 101 determines that the instruction is not received (NO in step S1501), the CPU 101 waits until the transmission instruction given by the user is received.

In step S1502, the CPU 101 determines whether a preprocessing flag corresponding to the document file designated as a transmission object is stored in the hard disk 103 by referring to the document file management table 1301 illustrated in FIG. 13. If the preprocessing flag is stored (YES in step S1502), the process proceeds to step S1503. If the preprocessing flag is not stored (NO in step S1502), the process proceeds to step S1505.

In step S1503, the CPU 101 instructs the image processing unit 108 to execute the rendering processing on the document file as a transmission object and generates rendering data. In step S1504, when the rendering processing is completed, the CPU 101 controls the modem 110 to start the communication with the destination facsimile machine and transmits the generated rendering data.

On the other hand, in step S1505, the CPU 101 controls the modem 110 to start the communication with the destination facsimile machine as well as instructs the image processing unit 108 to execute the rendering processing on the document file, and transmits the obtained rendering data to the facsimile machine.

Although the rendering processing performed by the image processing unit 108 is started after the communication with the destination facsimile machine is started in the above-described example, the rendering processing can be started at different timing. In other words, the communication can be started after the rendering processing of a part of the document file as the transmission object is completed. The rest of the rendering processing can be executed in parallel with the communication processing after the communication is started.

As described above, according to the fourth exemplary embodiment, before the transmission instruction given by the user is received, the processing for converting the file stored in the hard disk 103 into transmission data (rendering processing) is executed while the time required for the processing is measured for each page. Additionally, if a page whose value of the time required for the rendering processing is greater than the predetermined limit value 201 exists, a preprocessing flag is stored.

When the transmission instruction given by the user is received, the CPU 101 determines whether the preprocessing flag is stored. If the CPU 101 determines that the preprocessing flag is stored, the communication is started after the rendering processing on the document file is completed. On the other hand, if the CPU 101 determines that the preprocessing flag is not stored, the rendering processing of the document file is executed in parallel with the transmission processing of the rendering data.

In this way, if a document file that does not take much time in the rendering processing is to be transmitted, since the conversion processing is performed in parallel with the transmission processing, the entire processing time can be reduced. Further, if a document file that takes much time in the rendering processing is to be transmitted, the rendering data is generated before the transmission processing. Thus, the transmission error that occurs when the conversion processing is not completed in time while the rendering data is being transmitted can be prevented.

Further, since a preprocessing flag is stored instead of the rendering data obtained by the rendering processing performed in advance, the amount of memory resources to be used can be reduced.

The first to the fourth exemplary embodiments can be realized separately or in combination. Furthermore, if a plurality of modes used for executing each processing described in the first to the fourth exemplary embodiments are provided and a manager is assigned, then the manager can change the mode and make settings.

Aspects of the present invention can be achieved by supplying a computer-readable storage medium, in which a software program code that includes computer-executable instructions configured to realize functions according to the above-described exemplary embodiments is stored, to a system or an apparatus, and reading out the program code stored in the computer-readable storage medium by a computer (or CPU or micro-processing unit (MPU)) of the system or the apparatus.

In this case, the program code read out from the storage medium itself may realize functions according to aspects of the above-described exemplary embodiments, and the computer-readable storage medium which stores the program code may also fall within the scope of the present invention.

Aspects of the present invention can also be realized by a computer of a system or apparatus (or devices such as a CPU or MPU) that reads out and executes a program of computer-executable instructions recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

An operating system (OS) or other application software running on a computer can execute part or all of actual processing based on instructions of the program to realize the functions one or more of the above-described exemplary embodiments.

Additionally, the program read out of a storage medium can be written into a memory of a function expansion card inserted in a computer or into a memory of a function expansion unit connected to the computer. In this case, based on instructions of the program, a CPU or MPU provided on the function expansion card or the function expansion unit can execute part or all of the processing to realize the functions of one or more of the above-described exemplary embodiments.

A wide variety of storage media may be used to store the program. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-031147 filed Feb. 13, 2009, which is hereby incorporated by reference herein in its entirety.

What is claimed is:

1. A communication apparatus comprising:
a converting unit configured to execute conversion processing for converting a file into transmission data;
a transmitting unit configured to transmit the transmission data obtained by the conversion processing executed by the converting unit;
a determining unit configured to determine, before a transmission instruction of the file is received from a user, whether the file includes a page of which time required for the conversion processing executed by the converting unit is greater than a predetermined value; and
a controlling unit configured to cause, if the determining unit determines that the file includes the page of which time required for the conversion processing executed by the converting unit is greater than the predetermined value, the transmitting unit to execute transmission of the transmission data after the converting unit completes the conversion processing, and cause, if the determining unit determines that the file does not include the page of which time required for the conversion processing executed by the converting unit is greater than the predetermined value, the transmitting unit to start the transmission of the transmission data before the converting unit completes the conversion processing.

2. The communication apparatus according to claim 1, further comprising a storage unit configured to store the file, wherein the converting unit executes the conversion processing of the file stored in the storage unit into the transmission data before the transmission instruction of the file is received from the user, and wherein the determining unit determines, before the transmission instruction of the file is received from the user, whether the file includes the page of which time required for the conversion processing executed by the converting unit is greater than the predetermined value.

3. The communication apparatus according to claim 1, further comprising a holding unit configured to hold the transmission data obtained by the conversion processing if the determining unit determines that the file includes the page of which time required for the conversion processing executed by the converting unit is greater than the predetermined value, and configured to delete the transmission data obtained by the conversion processing if the determining unit determines that the file does not include the page of which time required for the conversion processing executed by the converting unit is greater than the predetermined value.

4. The communication apparatus according to claim 3, wherein after the transmitting unit executes first transmission processing, if the file includes a page of which time required for the conversion processing executed by the converting unit for the first transmission processing is greater than the predetermined value, the holding unit holds transmission data obtained by the conversion processing for the first transmission processing and the transmission data obtained by the conversion processing is used for second transmission processing executed after the first transmission processing.

5. The communication apparatus according to claim 3, further comprising a judging unit configured to judge, if the transmission instruction of the file is received by the user, whether transmission data obtained by the conversion processing of the file is held in the holding unit,
wherein if the judging unit judges that the transmission data obtained by converting the file is held in the holding unit, the transmitting unit transmits the transmission data held in the holding unit, and, if the transmission data obtained by a conversion of the file is not held in the holding unit, the control unit causes the converting unit to execute the conversion processing and causes the transmitting unit to start transmission of the transmission data obtained by the conversion processing after the converting unit completes the conversion processing.

6. The communication apparatus according to claim 1, wherein the predetermined value is changeable by the user.

7. The communication apparatus according to claim 1, wherein the controlling unit includes a managing unit configured to manage information indicating whether the file includes a page of which time required for the conversion processing executed by the converting unit is greater than a predetermined value, and wherein the controlling unit executes the control based on the information managed by the managing unit.

8. The communication apparatus according to claim 7, wherein the controlling unit causes, if a transmission instruction for transmitting a file which includes a page of which time required for the conversion processing executed by the converting unit is greater than a predetermined value is received from by the user, the transmitting unit to start transmission of the transmission data after the conversion processing is completed, and causes, if a transmission instruction for transmitting a file which does not include a page of which time required for the conversion processing executed by the converting unit is greater than a predetermined value is received from the user, the transmitting unit to start transmission of the transmitting data before the converting unit completes the conversion processing.

9. A control method for controlling a communication apparatus, the control method comprising:
performing conversion processing to convert an input file into transmission data;
transmitting the transmission data obtained by the conversion processing;
determining, before a transmission instruction of the file is received from a user, whether the file includes a page of which time required for the conversion processing is greater than a predetermined value;
causing the communication apparatus, if it is determined that the file includes the page of which time required for the conversion processing to be executed is greater than the predetermined value, to start transmission of the transmission data after the conversion processing is completed, and
causing the communication apparatus, if it is determined that the file does not include the page of which time required for the conversion processing to be executed is greater than the predetermined value, to execute transmission of the transmission data before the conversion processing is completed.

10. A non-transitory computer-readable storage medium for storing a computer program for controlling a communication apparatus, the computer program comprising:
computer-executable instructions to perform conversion processing of an input file into transmission data;
computer-executable instructions to transmit the transmission data obtained by the conversion processing;
computer-executable instructions to determine, before a transmission instruction of the file is received from a user, whether the file includes a page of which time required for the conversion processing is greater than a predetermined value; and
computer-executable instructions to cause the communication apparatus, if it is determined that the file includes the page of which time required for the conversion processing to be executed is greater than the predetermined value, to execute transmission of the transmission data after of the conversion processing is completed, and to cause the communication apparatus, if it is determined that the file does not include the page of which time required for the conversion processing to be executed is greater than the predetermined value, to start transmission of the transmitting data before the conversion processing is completed.

\* \* \* \* \*